United States Patent [19]
Lambert et al.

[11] 3,745,434
[45] July 10, 1973

[54] MOTOR POWER AND CONTROL CIRCUIT

[75] Inventors: Joe C. Lambert, Roanoke; Sherrill G. Thomas, Goodview, both of Va.

[73] Assignee: General Electric Company, Salem, Va.

[22] Filed: Dec. 29, 1971

[21] Appl. No.: 213,516

[52] U.S. Cl. .............................................. 318/139
[51] Int. Cl. .............................................. B60l 11/18
[58] Field of Search .................. 318/138, 139, 269, 318/273, 376

[56] References Cited
UNITED STATES PATENTS

| | | | |
|---|---|---|---|
| 3,280,397 | 10/1966 | Bruns | 318/139 |
| 3,551,774 | 12/1970 | Rusch | 318/139 X |
| 3,628,621 | 12/1971 | Lee | 318/139 X |
| 3,636,422 | 1/1972 | Miller et al. | 318/269 X |

*Primary Examiner*—Bernard A. Gilheany
*Assistant Examiner*—W. E. Duncanson, Jr.
*Attorney*—Arnold E. Renner et al.

[57] ABSTRACT

A power and control circuit for utilizing the power generated by a shunt motor operating as a generator during coasting and braking. The circuit includes a switching arrangement to selectively effect connection of the motor armature with segments of a power storage device shown in the illustrated embodiment as a battery. Suitable circuitry including a bistable device capable upon each power application of sequencing its output to switch battery segment connections across the motor armature further includes switching devices to control the operational mode of the motor. The switching of battery segment connections permits, during coasting and braking, the charging of individual segments at a voltage level less than that required to charge the entire battery. There is provided means for regenerative braking of the motor through a resistive element in series with the motor field winding such that braking is adjusted in proportion to the value of the resistance.

17 Claims, 1 Drawing Figure

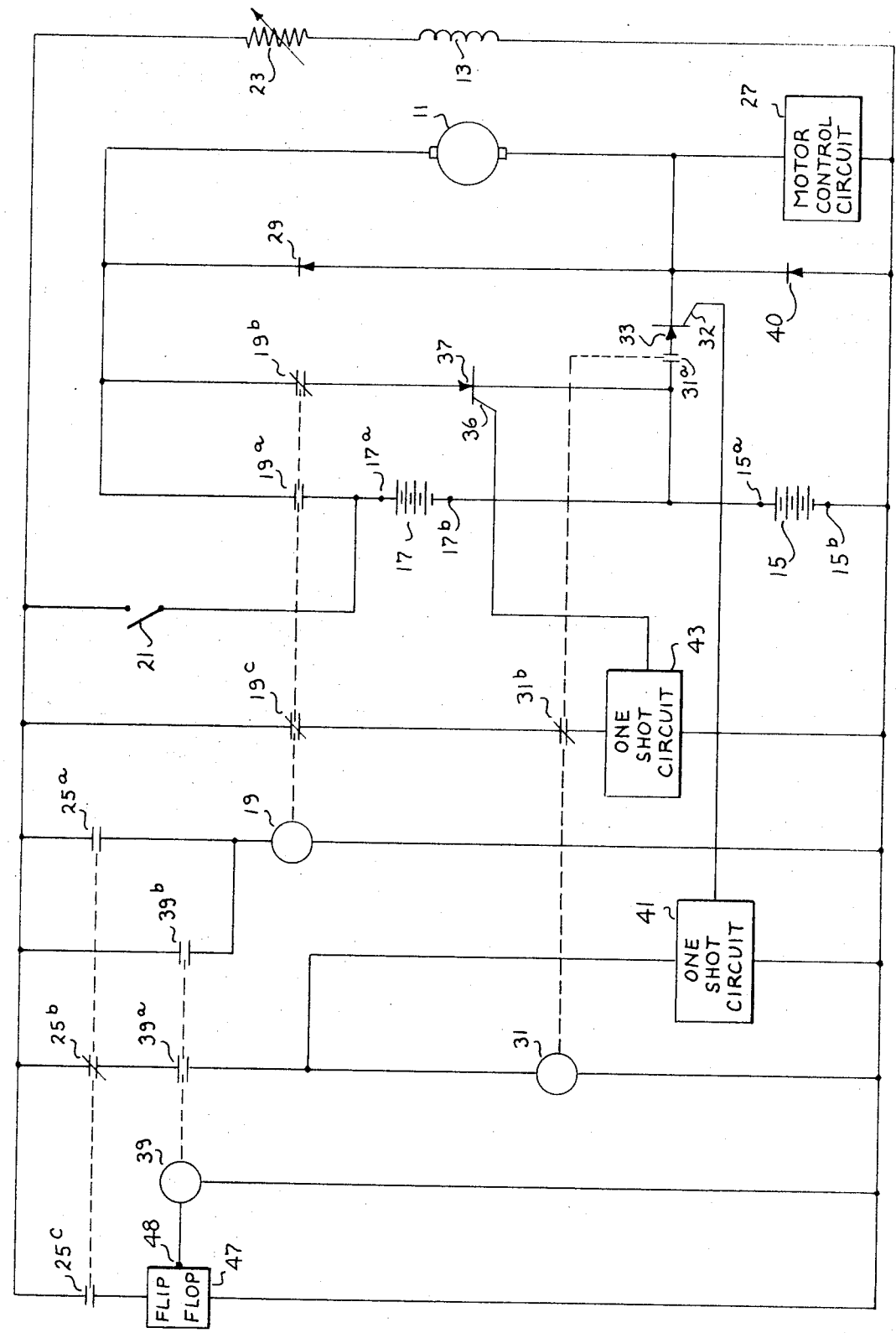

MOTOR POWER AND CONTROL CIRCUIT

BACKGROUND OF THE INVENTION

The present invention relates generally to a power and control circuit for switching connections between a direct current shunt motor and a suitable power storage device such as a battery. The power storage device will hereinafter be referred to as a battery. More particularly, the circuit relates to a power and control circuit for charging battery segments selectively with current from the motor when operating as a generator. Effective charging is provided to a battery segment even though the generated voltage is less than the amount required to charge the entire battery.

The use of battery powered motors is generally restricted by the amount of energy which the battery is capable of storing. In an effort to extend the useful life of battery charge, power consuming devices in the control circuitry have been generally eliminated, for the most part, so that the bulk of the energy consumed is within the controlled motor. The amount of energy which is required of a battery for a load such as a controlled direct current motor may be substantially reduced if control elements such as resistor banks and other such power consuming devices are replaced by devices which supply the required motor demand by connecting and disconnecting the total load to the battery. The amount of power dissipated can be varied in direct relation to the time the load is connected to the battery. In the prior art and in the present invention, solid state switching devices have been used to supply the varying power demand of the load. The solid state switching devices normally used in applications of this nature are known as thyristors. The most commonly used thyristor is the silicon controlled rectifier described in "SCR Manual 4th Edition", Copyright 1967 by General Electric Company.

The thyristor is rendered conductive by the simultaneous application of a forward voltage bias and a gating signal. Conduction, if established, will continue after removal of the gating signal until a zero or reverse voltage bias is applied to the thyristor terminals. An example of a motor control circuit embodying the type of control just described is detailed in U.S. Pat. No. 3,335,351, "DC Motor Control Circuit" issued Aug. 8, 1967, to H. E. Morris (Class 318), the referenced patent being assigned to the assignee of the present invention.

The present invention makes use of two other types of well known circuits. One type is a monostable multivibrator commonly known as a one shot circuit, and the other type is a bistable multivibrator commonly known as a flip-flop. It is, of course, to be realized that other circuits, performing similar functions, could be substituted for those illustrated.

In addition to the discriminate application of motor controls, another way to extend useful battery life is to use the motor as a generator during periods of coasting and braking and to impress the voltage thus generated across the battery terminals. It has been found, however, that the voltage so generated is normally less than that required to effect any significant charging of the battery.

It is, therefore, an object of the present invention to effectively utilize the energy produced when the motor is operating as a generator.

It is another object of the present invention to provide means for significantly extending the time period a battery can provide sufficient power to drive a motor load.

It is a further object to extend said time period while using the same type of batteries used heretofore.

SUMMARY OF THE INVENTION

The foregoing and other objects are achieved, in accordance with the present invention, by providing a novel power and control circuit for a battery powered shunt motor. The generated voltage of a motor during the coasting and braking is selectively applied at varying intervals across each one of a plurality of series connected battery segments. Over a period of time an approximately even charge is applied among the individual segments. The novel circuit extends the effective life of the battery by affording means to charge each battery segment individually with a voltage greater than that of the individual segment but less than the voltage necessary to charge the total battery.

DESCRIPTION OF THE DRAWINGS

The foregoing and other objects of the present invention will become apparent as the following description proceeds and features of novelty which characterize the invention will be pointed out in particularity in the claims affixed to and forming a part of this specification. For a better understanding of this invention, reference is made to the accompanying drawing in which the single FIGURE is a schematic drawing illustrating the present invention in its preferred embodiment.

DETAILED DESCRIPTION

Referring now to drawing, the novel features of the invention are disclosed by the illustrated power and control circuit for a battery powered shunt motor, the motor being represented by an armature 11 and a shunt connected field winding 13. A switching means, described later, is included to provide three modes of connection for the armature 11 in relation to a battery depicted as a pair of battery segments 15 and 17. Although only two segments are shown, additional segments could be connected by circuit modification. The three modes of connection for segments 15 and 17 are as follows:

1. Mode 1 — segments 15 and 17 are series connected in a manner to supply power to the motor.
2. Mode 2 — segment 17 is connected in a manner to receive power generated by the motor during coasting and braking.
3. Mode 3 — segment 15 is connected in a manner to receive power generated by the motor during coasting and braking.

A detailed description of the manner of connection for each mode is given later. Only one of the three connection modes can be effected at a time.

A positive terminal 15a, at the top of segment 15, is normally series connected to a negative terminal 17b at the bottom of segment 17. A master switch 21, connected to a positive terminal 17a at the top of segment 17, serves to connect and disconnect the segments from the rest of the circuit. When master switch 21 is closed, a field control loop is completed from the free side of switch 21 through a variable resistor 23 and field winding 13 to a negative terminal 15b at the bottom of segment 15.

Resistor 23 is normally biased by a suitable means (not shown), for example, a spring, to a predetermined maximum value; consequently, a fixed minimum current will normally flow through winding 13 to establish a constant field for armature 11. The biasing means is overcome only if braking is desired whereupon the resistance of resistor 23 is selectively varied to a value less than maximum resistance. With a reduction in resistance, a greater current can flow through winding 13 to increase the field strength of winding 13. Regenerative braking is effected in proportion to the increase in the field strength of winding 13. If more motor torque is desired, a bypass contact (not shown) could be placed around resistor 23. The circuit would require only slight modification to add a bypass contact that would close only if power is applied to the motor. Upon removal of power, the contact would open and resistor 23 would be used in the same manner as if the bypass contact were not in the circuit.

The switching means which selectively effects one of three modes of connection includes components which are detailed under descriptions of the selected connection modes. Switching is initiated by the operation of a three-pole switch represented by a normally open contact 25a, a normally closed contact 25b, and a normally open contact 25c. The three-pole switch is connected to the free side of switch 21 in parallel with the field control loop. Contacts 25a, 25b, and 25c are mechanically operated by a suitable device such as an accelerator (not shown) to change state upon the actuation and upon the release of the device. Power, made available from the battery when switch 21 is closed, is provided via contacts 25a, 25b, and 25c to control loops described in the following descriptions of connection modes. Suitable means are provided to assure electrical isolation of connection modes. Isolating contacts and thyristors are used in the preferred embodiment. The isolating means is recited at the end of each connection mode. The operation of the isolating means is not presented along with the recitation since the operation is detailed along with the development of the circuit.

Mode 1 Connection:

Normally open contact 25a is closed upon accelerator operation to establish a control loop connected from the free side of contact 25a through a coil 19 to terminal 15b. Coil 19 is thus energized to close an associated normally open contact 19a and to open two associated normally closed contacts 19b and 19c. Contacts 19a, 19b, and 19c are mechanically interlocked for simultaneous operation. A power loop from contact 19a through armature 11 and a motor control circuit 27 to terminal 15b is established by the closure of contact 19a. The control circuit 27 is of any suitable type, for example that described in the aforementioned U.S. Pat. No. 3,335,351. Current will flow in a clockwise direction from terminal 17a through a top to bottom path of armature 11 to be governed by the ratio of on to off time afforded by the control circuit 27. The average current level provided by motor control 27 is raised by a flyback diode 29 in parallel with the armature 11.

Normally closed contact 25b is opened upon accelerator depression, and normally open contact 25c is closed. A flip-flop 47 is connected from the free end of contact 25c to terminal 15b. The flip-flop 47 has an output terminal 48 which is connected through a coil 39 to terminal 15b. Each power application to flip-flop 47 sequences its output state which appears at output terminal 48 (it is also feasible to sequence the output state on removal of power). Either an output or no output will appear at terminal 48. If there is an output, power is applied from terminal 48 through coil 39 to terminal 15b; the application of power energizes coil 39 to close a normally open contact 39a and a mechanically interlocked normally open contact 39b. Upon release of the accelerator, a Mode 2 connection will be initiated. If there is no output at terminal 48, coil 39 is not energized and contacts 39a and 39b remain open and, upon release of the accelerator, a Mode 3 connection will be initiated. A closed status of contacts 39a and 39b is required to effect a Mode 2 connection, and an open status of contacts 39a and 39b is required to effect a Mode 3 connection. It is necessary that the accelerator be released to provide Mode 2 and Mode 3 connections. It is also necessary to perform a Mode 1 connection between each Mode 2 and Mode 3 connection to effect sequencing as afforded by flip-flop 47.

Electrical isolation of the Mode 1 connection is provided by the opening of contacts 19b, 19c, and 25b. Contacts 19a and 25b must be closed in a Mode 2 connection. Contact 19c must be closed in a Mode 3 connection.

Mode 2 connection:

Contacts 39a and 39b are closed for a Mode 2 connection as previously described. Contact 25b, closed upon accelerator release, sets up a control loop from the free end of contact 25b to terminal 15b through a coil 31 parallel connected with a one shot circuit 41. The power application to coil 31 closes a normally open contact 31a and opens normally closed contact 31b. The power application to one shot circuit 41 initiates a single pulse which is applied to a gate 32 of a thyristor 33 to gate thyristor 33 into conduction. Thyristor 33 will continue to conduct until counter electromotive force falls below the voltage of segment 17 or until power is removed from the anode of thyristor 33 by the opening of contact 31a. Contact 39b maintains the power application upon coil 19 to hold contact 19a closed even though contact 25a is open upon accelerator release. The motor now rotating inertially acts as a generator so that current will flow in a counterclockwise direction in a power loop circuit from the top of armature 11 through contact 19a to terminal 17a. The circuit is completed from terminal 17b through contact 31a to the anode of thyristor 33, thence from the cathode of thryistor 33 to the bottom of armature 11. Segment 17 is thus connected across armature 11 to receive charging.

Electrical isolation of the Mode 2 connection is provided by the opening of contacts 19b, 19c, and 31a. Thyristor 37 cannot be pulsed on by a one shot circuit 43 is contact 19c is open. Open contacts 19b and 19c and a non-conductive status in thyristor 33 inhibit a Mode 3 connection. Motor control 27 is turned off to inhibit a Mode 1 connection.

Mode 3 connection:

Contacts 39a and 39b are open for a Mode 3 connection as previously described. A control loop is connected from the free end of switch 21 in parallel with the control loops connected to the three-pole switch. The control loop is connected from switch 21 to terminal 15b via normally closed contact 19c, normally closed contact 31b and one shot circuit 43. Upon completion of the control loop, one shot circuit 43 will emit a single pulse to a gate 36 of a thyristor 37 to gate thyristor 37 into the conduction. Thyristor 37 will continue to conduct until counter electromotive force falls below the voltage of segment 15 or until power is removed from the anode of thyristor 37 by the opening of contact 19b. The motor now rotating inertially acts as a generator so that current will flow in a counterclockwise direction in a power loop from the top of armature 11 through normally closed contact 19b and the anode of thyristor 37, then from the cathode of thyristor 37 to terminal 15a. The circuit is completed from terminal 15b through the anode to cathode path of a motor control bypass diode 40 to the bottom of armature 11. Segment 15 is thus connected across armature 11 to receive charging.

Electrical isolation to prevent a Mode 2 connection is provided by the opening of contacts 39a and 19a. Thyristor 33 cannot be gated on by one shot circuit 41 and contact 31a will not close if contact 39a is open. Mode 1 operation is inhibited by motor control 27. Contact 19a is open to inhibit Mode 1 and Mode 2 connection.

General:

For each connection mode, the status of the previously described devices is indicated in Table 1 by an "X" for a closed or an energized device and by a "—" for an open or deenergized device.

TABLE 1

| Device | Mode 1 | Mode 2 | Mode 1 | Mode 3 |
|---|---|---|---|---|
| Coil 19 | X | X | X | |
| Contact 19a | X | X | X | |
| Contact 19b | | | | X |
| Contact 19c | | | | X |
| Contact 25a | X | | X | |
| Contact 25b | | X | | X |
| Contact 25c | X | | X | |
| Coil 31 | | X | | |
| Contact 31a | | X | | |
| Contact 31b | X | | X | X |
| Thyristor 33 | | X | | |
| Thyristor 37 | | | | X |
| Coil 39 | X | X | | |
| Contact 39a | X | X | | |
| Contact 39b | X | X | | |
| One Shot 41 | | X | | |
| One Shot 43 | | | | X |

Table 1 lists in columns from left to right the sequence of modes from Mode 1 through Mode 3. Upon completion of the sequence, the modes would be repeated again and again. Since the previous description first used a Mode 1 connection in which contacts 39a and 39b were closed, Table 1 includes first a Mode 1 connection in which contacts 39a and 39b are closed. The closure of contacts 39a and 39b in the initial Mode 1 connection as shown in Table 1 is arbitrary. Contacts 39a and 39b could be opened in which case Mode 1 and Mode 2 listed respectively in the first and second columns would be interchanged respectively with the third and fourth columns. Rearrangement of the order of sequencing of modes can be provided for connection of additional segments.

While the foregoing description has been directed primarily to an arrangement including a bistable device to control sequencing of connection modes, it will be immediately obvious to those skilled in the art that the present invention is not so limited and the appended claims are, therefore, intended to cover the full spirit and scope of the present invention.

What is claimed is:

1. A power and control circuit for use with a direct current electric motor selectively operable as a motor and as a generator comprising:
    a. a source of stored electrical energy comprised of a plurality of segments;
    b. first switching means selectively operable to supply electrical energy from said source to said motor to thereby effect motor operation;
    c. second switching means selectively operable when said motor is acting as a generator to connect said motor to a first segment of said source; and,
    d. third switching means selectively operable when said motor is acting as a generator to connect said motor to a second segment of said source.

2. The invention in accordance with claim 1 wherein said source of stored electrical energy is a battery.

3. The invention in accordance with claim 1 further including means to sequence the operation of said second and said third switching means in a predetermined manner.

4. The invention in accordance with claim 1 further including sequencing means to effect alternate operation of said second and said third switching means.

5. The invention in accordance with claim 4 wherein said sequencing means includes a bistable device.

6. The invention in accordance with claim 1 wherein there is further included means to assure the independent operation of said first, second and third switching means.

7. The invention in accordance with claim 1 wherein said motor is shunt connected.

8. The invention in accordance with claim 1 wherein each of the segments of said source is capable of being recharged at a voltage generated by said motor when acting as a generator.

9. The invention in accordance with claim 1 wherein said first switching means includes circuit means for varying the effective power delivered from said source to said motor by varying the percentage of time the source is connected to the motor.

10. A power and control circuit for use with a battery powered direct current motor which motor is also capable of acting as a generator during coasting periods to develop electrical energy for recharging said battery, said circuit comprising:
    a. a battery including a plurality of discrete battery segments;
    b. first switching means operative to connect said segments in series with said motor to thereby supply electrical power to said motor and effect the operation thereof; and,
    c. additional switching means operative upon successive operations of the motor as a generator to sequentially connect each of said discrete battery segments to said motor whereby said segments are provided with a charging action.

11. The invention in accordance with claim 10 wherein said additional switching means includes second and third switching means alternately operative to effect the charging action alternately on first and second battery segments.

12. The invention in accordance with claim 11 wherein said additional switching means further includes a bistable device to effect the operation of said second and third switching means.

13. The invention in accordance with claim 11 wherein the alternate operation of said second and third switching means is occasioned by sequential operations of said motor as a generator.

14. The invention in accordance with claim 10 wherein the first switching means includes circuit means for varying the effective power delivered from said source to said motor by varying the percentage of time the battery is connected to the motor.

15. The invention in accordance with claim 14 wherein said circuit means includes a chopper circuit.

16. The invention in accordance with claim 11 wherein there is further included means to assure the independent operation of said first, second and third switching means.

17. The invention in accordance with claim 10 wherein said motor is shunt connected.

* * * * *